Sept. 13, 1927.   J. WIKSCHTRÖM   1,642,597
MACHINE FOR MANUFACTURING NAILS FROM WIRE
Filed Oct. 17, 1925   6 Sheets-Sheet 3
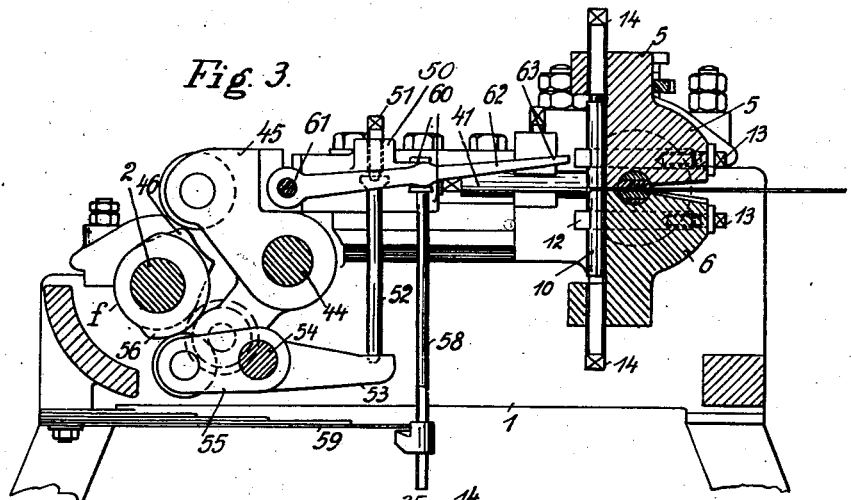
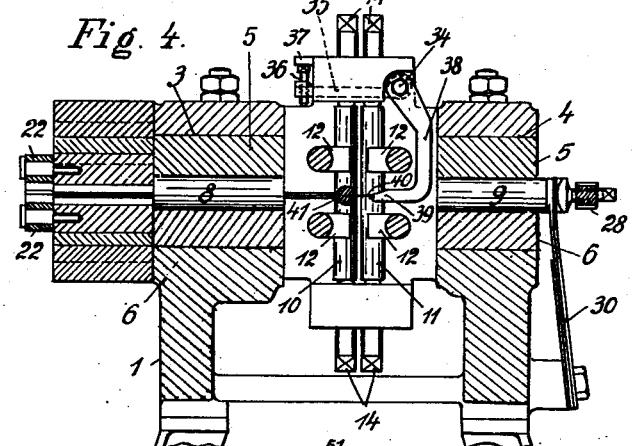
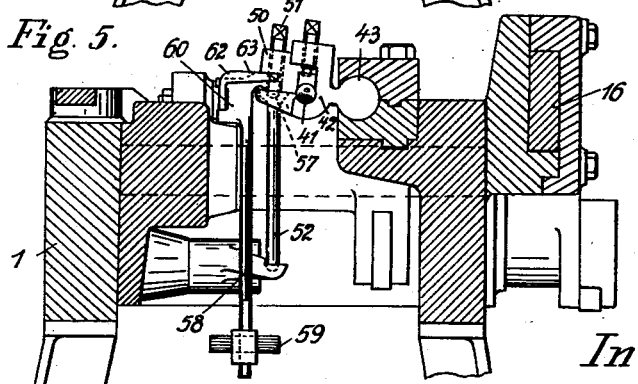
Inventor:
Jakob Wikschtröm
By William C. Linton
Attorney Sept. 13, 1927.  1,642,597
J. WIKSCHTRÖM
MACHINE FOR MANUFACTURING NAILS FROM WIRE
Filed Oct. 17, 1925  6 Sheets-Sheet 4
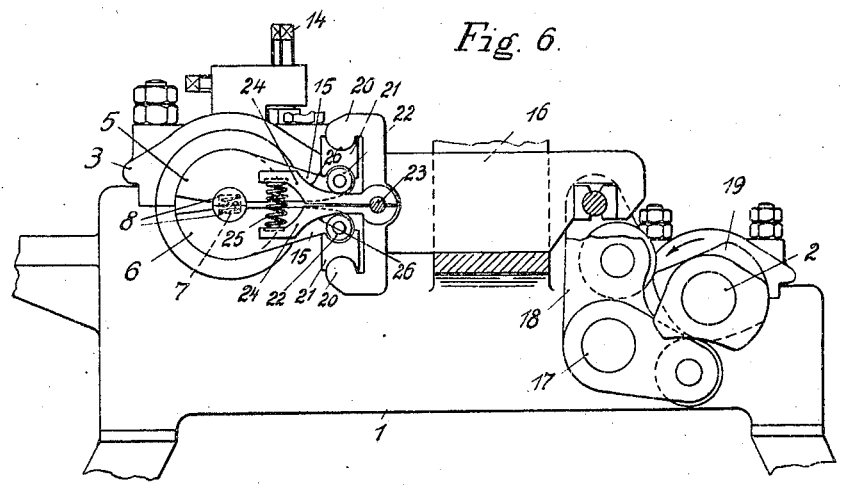
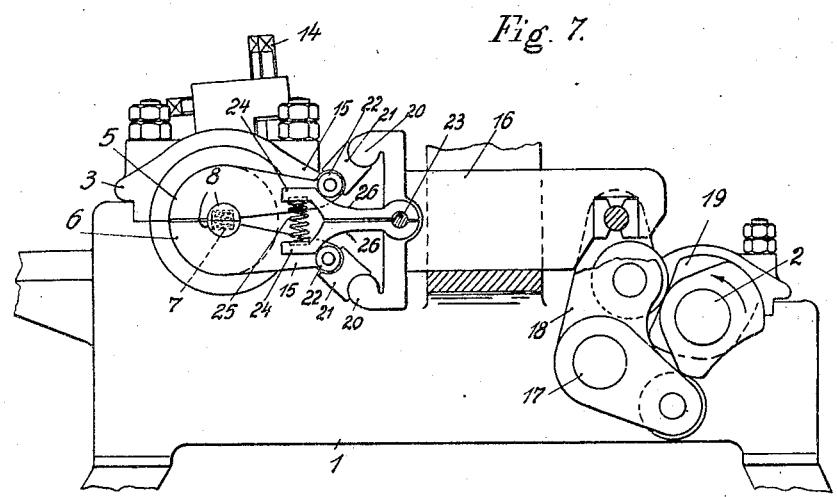
Inventor:
Jakob Wikschtröm
By William C. Linton.
Attorney.

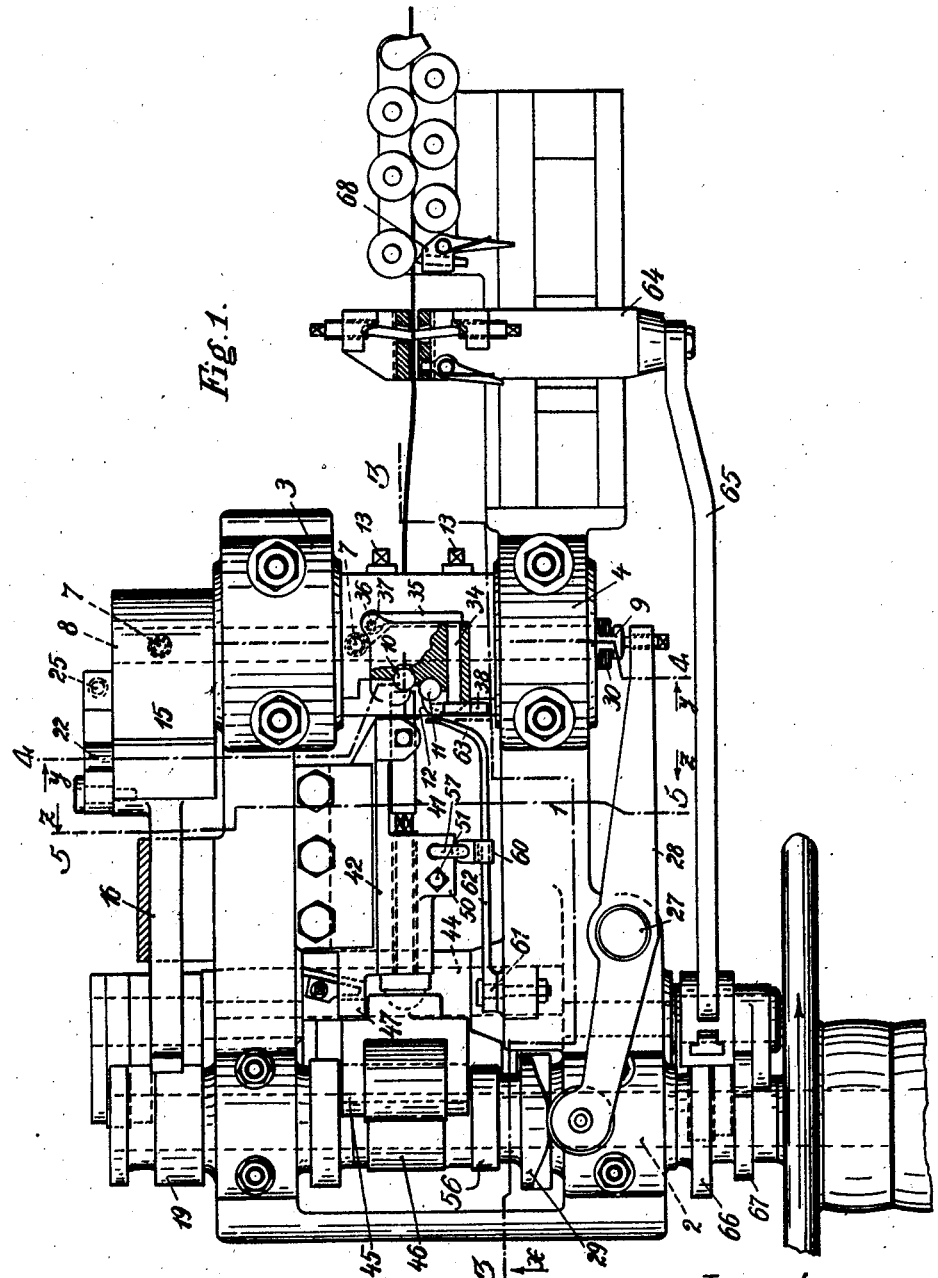

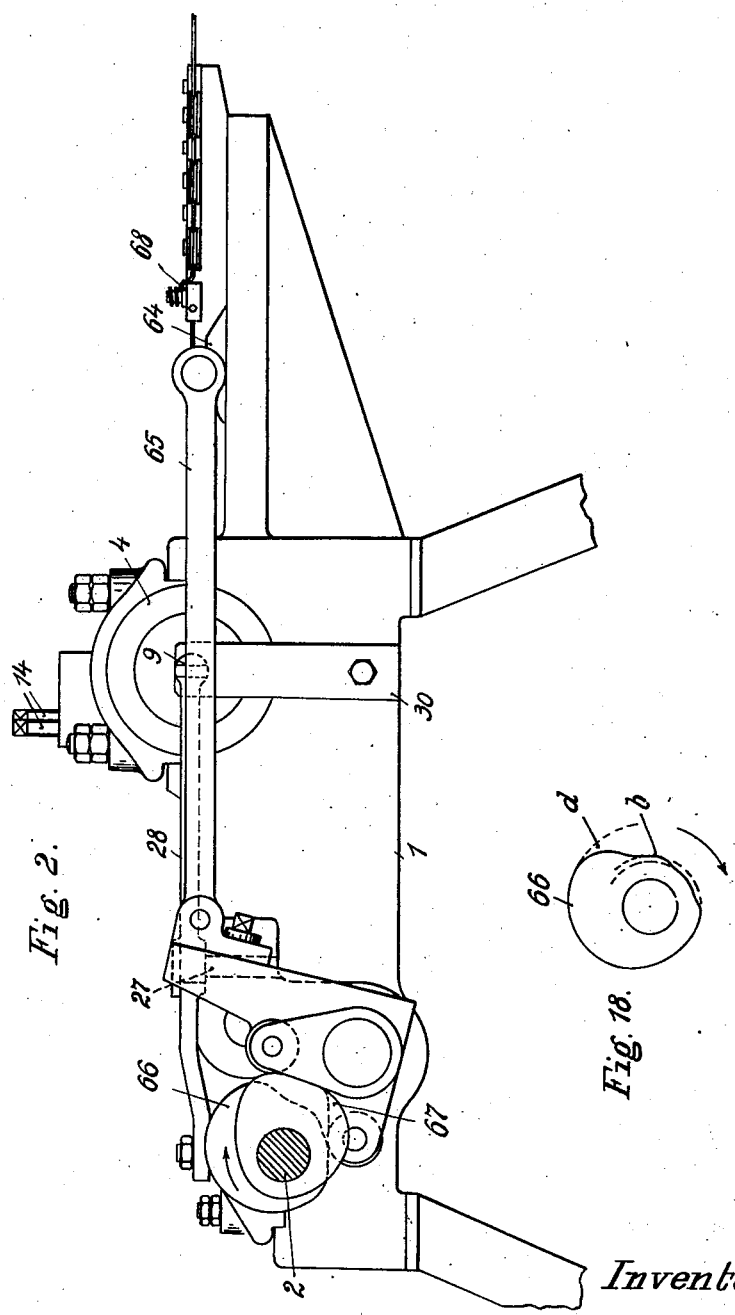

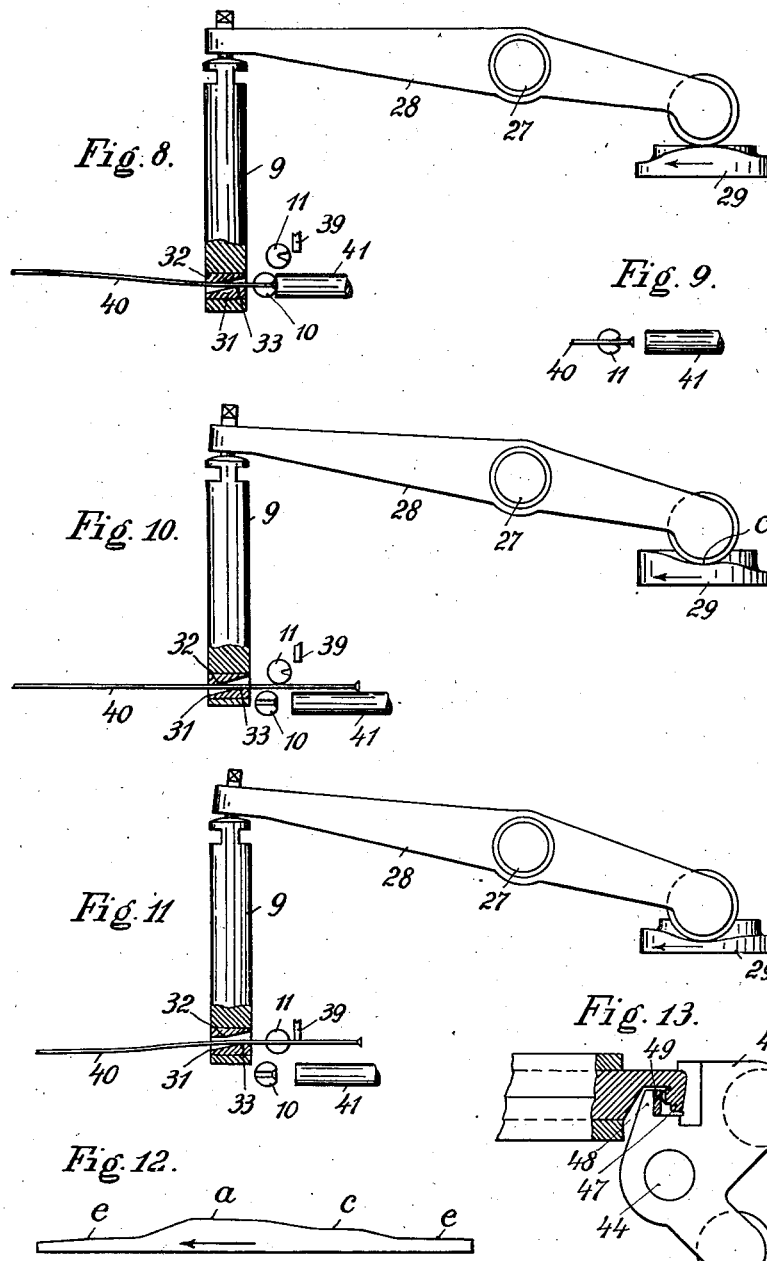

Sept. 13, 1927. 1,642,597
J. WIKSCHTRÖM
MACHINE FOR MANUFACTURING NAILS FROM WIRE
Filed Oct. 17, 1925 6 Sheets-Sheet 6
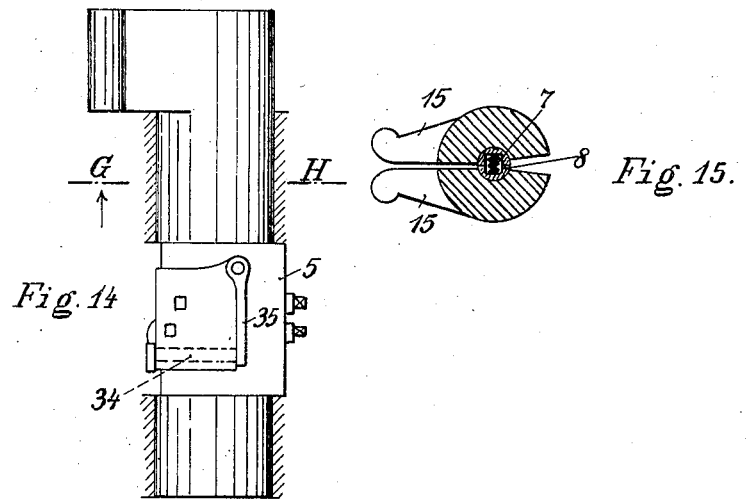
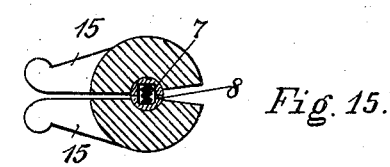
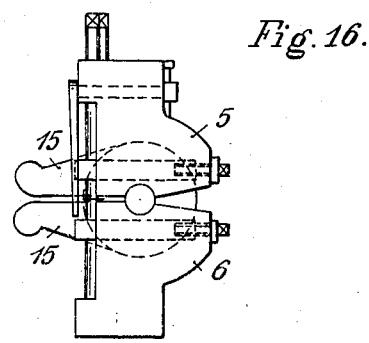
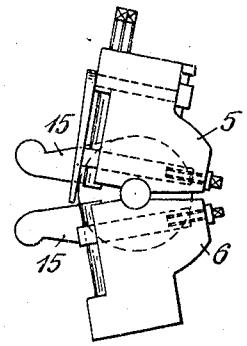
Inventor:
Jakob Wikschtröm
By William C. Linton.
Attorney.

Patented Sept. 13, 1927.

1,642,597

UNITED STATES PATENT OFFICE.

JAKOB WIKSCHTRÖM, OF DUSSELDORF, GERMANY.

MACHINE FOR MANUFACTURING NAILS FROM WIRE.

Application filed October 17, 1925, Serial No. 63,107, and in Germany July 9, 1925.

The invention relates to a machine for manufacturing nails from wire.

The substantial novelty consists in that the clamping jaws and point cutters are journalled together side by side in one pair of operating levers whose axis of rotation is at right angles to the axis of the wire. The displacement of the wire into register with the clamping jaws or point cutter takes place in the axial direction of the pair of operating levers.

The rotary movement of the operating levers is entirely positive.

The nail head stamping tool is mounted in a lever which is journalled parallel to the wire axis and adapted to be displaced longitudinally.

In order that my invention may be more clearly understood and more readily carried into practice I have appended hereto six sheets of drawings, in which:

Fig. 1 is a plan view, Fig. 2 is a side elevation. Fig. 3 is a section on line 3—3 in Fig. 1 in the direction of the arrow $x$; Fig. 4 is a section on line 4—4 in Fig. 1 in the direction of the arrow $y$; Fig. 5 is a section on line 5—5 in Fig. 1 in the direction of the arrow $z$. Figs. 6 and 7 show the movement of the pair of operating levers in side elevation in two different working positions; and Figs. 8–18 show details.

In the machine frame 1 is journalled, in known manner, the main shaft 2 on which are mounted the cam discs 19, 29, 46, 56, 66, 67 for the various working movements.

The operating levers 5, 6 are journalled in two bearings 3, 4 arranged in the machine frame. Said levers form pivots of approximately semi-circular shape at the points of their bearing. The cam-lifts correspond to the amount of movement necessary (Figs. 14–17).

The levers 5, 6 are machined axially forming a hollow space concentric with the bearing and extending over the whole length of said levers. In the one half of said hollow space is mounted a two-part shaft 8 provided internally with springs 7, which serve to press the levers 5, 6 into their bearings; whilst on the other side, instead of the shaft 8, a longitudinally movable shaft 9 is situated. The clamping jaws 10 and the point cutters 11 between their bearings 3 and 4 are situated on said levers and are secured to the levers 5 and 6 by means of hook-shaped bolts 12 provided in the levers 5, 6 and held therein by the screws 13.

The longitudinal adjustment of these tools is effected, in known manner, by means of screws 14. On an extension of the levers 5, 6 and projecting beyond their bearing are the operating arms 15. The yielding shaft 8 at the axis of rotation of the levers 5, 6 is situated at the side which carries the operating arms 15.

The movement of the operating arms 15 is effected by means of a slide 16 mounted in the machine frame; said slide is connected to a lever 18 journalled at 17 and actuated by a cam disc 19 mounted on the main shaft 2. The slide 16 is fork-shaped at the end facing the operating arms 15 (Figs. 6, 7). The two-fork arms 20 are arranged in a vertical plane and their ends are rounded off. Link members 21 are adapted to press against these rounded-off portions, and to engage with the similarly rounded-off ends of the operating arms 15. On the operating arms 15 are mounted lateral rollers 22 between which are situated two guide members 24 mounted on a pivot 23 secured to the slide 16 and pressed against the rollers 22 by means of a spring 25. The two guide members 24 are provided near their free ends with inclined surfaces 26.

The displacement of the shaft 9 is effected by means of a two-armed lever 28 pivoted at 27 and actuated by a cam disc 29 mounted on the main shaft 2 (Figs. 8, 10, 11).

The shaft 9 is pressed against the lever 28 by means of a spring 30 mounted on the machine frame 1.

The shaft 9 is provided, at the level of the wire-feed with a wire guide 31. Said wire guide contains a slot which is not straight, but is obliquely widened at each end. The surface 32 of the slot in the front or feed portion of the wire guide and the surface 33 in the rear portion of the guide are each parallel to the path of the wire; the distance between the two parallel surfaces 32, 33 corresponding to the thickness of the wire to be worked.

In the upper lever 5 is journalled at 34 a double-armed lever, one arm 35 of which is provided with an adjustment screw 36. One end of the screw 36 rests upon the lever 5 and contacts at its other end with a projecting lug on the lever 5. The other lever arm or stop member 38 is so bent that its end 39 serves, in the point-cutting-positions, as an abutment for the wire 40. The position of the abutment surface 39 can be adjusted by means of the screw 36.

A head-clamping tool 41 is mounted in a supporting lever 42 which is journalled laterally to the wire axis, in the bearing 43, situated at the level of the wire 40 and parallel thereto, so that the longitudinal movement of the lever 42 together with the head-stamping tool 41 can be effective, in known manner, by means of a stamping lever 45 journalled at 44 and actuated by the cam disc 46 mounted on the main shaft 2. For the purpose of positively returning the lever 42, it is provided with a hook-shaped projection 47 engaging a projection 48 on the stamping lever 45 (Fig. 13). The projections 47, 48 are situated exactly in the axis of rotation of the lever 42.

The lever 42 is held in permanent contact with the stamping lever 45 by a wedge 49. The contact surfaces of the projections 47, 48 are situated vertically above the pivot 44.

The lever 42 carries a projection 50 with an adjustment screw 51, which rests upon a rod 52, the latter resting on one arm 53 of the two-armed lever pivoted at 54, the other lever arm 55 being actuated by the cam disc 56. The hook-shaped end 57 of a rod 58, also rests on the projection 50 and is held thereon by the spring 59 mounted on the machine frame 1. The rod 58 is also provided with a forked projection 60 engaging a lever 62 which is pivoted at 61 and the end 63 of which is laterally bent and terminates in the proximity of the cutters and serves as nail ejector.

The feeding slide 64 is actuated by the pitman 65 by means of the cam disc 66 mounted on the main shaft 2; the counter cam disc 67 serves for the positive return movement. A separate locking lever 68 prevents backward movement of the wire during the return movement of the feeding slide 16.

The manner of operation of the machine is as follows:—

Fig. 1 shows the machine with the parts in their position subsequent to the finishing of the nail head. The two levers 5, 6 are in working position. The link-members 21 are brought into the position shown in Fig. 6 by the forward movement of the slide 16. The pressure of said levers is taken up by the two-fork-ends 20 so that the slide 16, the cam disc 19 and the main shaft 2 are relieved of pressure.

The shaft 9 is in the position shown in Fig. 8. The wire 40 is bent to the right by the shaft 9 behind the wire guide 31. The projecting end of the wire is, however, brought back into a position parallel with the wire feed by means of the two guide surfaces 32, 33, so that the clamping jaws 10 may correctly clamp the wire. This correct position of the shaft 9 is effected by the lift $a$ of the cam disc 29 (Figs. 8 and 12). On further rotation of the main shaft in the direction of the arrow (Fig. 6) the slide 16 is moved back whereby the link members 21 are brought out of their straight position and are then lifted on the two inclined surfaces 26 (Fig. 7). The two levers 5, 6 are thereby opened and also the clamping jaws 10, whereby the wire is freed. Now the lift $b$ of the cam disc 66 (Fig. 18) comes into action and feeds the wire so far that the nail head, formed in the die of the clamping jaws, emerges therefrom (Fig. 9). The wire remains in this position until the shaft 9 is brought out of the path of the stamping tool 41 by the lift $c$ of the cam disc 29 (Fig. 12), whereupon the wire is fed further by means of the lift $d$ of the cam disc 66 into the position shown in Fig. 10 and in accordance with the length of nail to be produced. The wire guide 31 is, at this stage, in the position in which the wire may freely pass between the two parallel surfaces 32, 33.

The slide 16 is now moved back by the cam disc 67, whereby the shaft 9 is further displaced to the left, by the lever 28 by its passing from the surface $c$ to the surface $e$ on the cam 29, and, simultaneously, the wire is brought to the level of the point cutter 11 (Fig. 11). The wire is held in this position, on the one hand on the surface 33 and on the other hand on the abutment surface 39, so that the wire is again situated parallel to the feed and comes in the correct position between the cutters. The slide 16 is, by a second lift on the cam disc 19, again moved to the left into the position shown in Fig. 6, whereby the cutters 11 form the nail point. Now on effecting the return movement of the slide 16 and the opening of the cutters 11, the surface $f$ of the cam disc 56 is brought under the end 55 of the double-armed lever, whereby the other end 53 is pressed down by the action of the spring 59 and the lever 42 is rocked in its bearing. The lever 62 engaging in the fork 60 of the rod 58 is likewise moved downwardly during said downward movement whereby its end 63 hits the finished nail and ejects the same downwardly. Simultaneously with this movement the pre-upsetting device of the head stamping tool is brought into the same level as the jaw channel. The shaft 9 is again brought into the position shown in Fig. 8 by the movement of the lever from the cam surface $e$ to the cam surface $a$ and the levers 5, 6, are again closed by the forward movement of the slide 16. The wire end projecting from the jaws, is subsequently formed into the nailhead by pre-upsetting and finish-upsetting and the described working process is repeated.

What I claim is:

1. In a machine for manufacturing nails from wire, clamping jaws and point cutters journalled side by side in one pair of operating levers, pivots of approximately semi-circular shaped formed by said levers, a two-part shaft on one side at the center of rotation of the said pivots, a longitudinally movable shaft on the other side at said center of rotation of the pivots and springs arranged in the two-part lever adapted to press the operating levers into their bearings.

2. In a machine for manufacturing nails from wire, clamping jaws and point cutters journalled side by side in one pair of operating levers, a fork-shaped slide for imparting positive opening and closing movements to the operating levers, spring pressed guide members between links carried by the operating levers and the forks of the slide, a nail head tool mounted in a supporting lever journalled laterally and parallel to the wire at the level of same, a stamping lever actuated by a cam on the main shaft for longitudinally moving the supporting lever and hook-shaped projections on the stamping lever and the supporting lever arranged exactly in the axis of the said supporting lever for connecting the latter to the stamping lever.

3. In a machine for manufacturing nails from wire, clamping jaws and point cutters journalled side by side in one pair of operating levers, a fork-shaped slide for imparting positive opening and closing movements to the operating levers, spring pressed guide members between links carried by the operating levers and the forks of the slide, a nail head tool mounted in a supporting lever journalled laterally and parallel to the wire axis at the level of same, a stamping lever actuated by a cam on the main shaft for longitudinally moving the supporting lever, hook-shaped connecting members on the supporting lever and the stamping lever, and a projecting lug on the supporting lever resting upon a rod-like member supported by the one arm of a pivoted lever the other arm of which engages with a cam on the main shaft.

4. In a machine for manufacturing nails from wire, clamping jaws and point cutters journalled side by side in one pair of operating levers, a fork-shaped slide for imparting positive opening and closing movements to the operating levers, spring pressed guide members between links carried by the operating levers and the forks of the slide, a nail head tool mounted in a supporting lever journalled laterally and parallel to the wire axis at the level of same, a stamping lever actuated by a cam on the main shaft for longitudinally moving the supporting lever, hook-shaped connecting members on the supporting lever and the stamping lever, a projecting lug on the supporting lever resting upon a rod-like member supported by the one arm of a pivoted lever the other arm of which is engaged by a cam on the main shaft and a second rod-like member urged downwardly by a spring secured to the machine frame and resting with its hook-shaped end upon said supporting lever.

5. In a machine for manufacturing nails from wire, clamping jaws and point cutters journalled side by side in one pair of operating levers, a fork-shaped slide for imparting positive opening and closing movements to the operating levers, spring pressed guide members between links carried by the operating levers and the forks of the slide, a nail head tool mounted in a supporting lever journalled laterally and parallel to the wire axis at the level of same, a stamping lever actuated by a cam on the main shaft for longitudinally moving the supporting lever, hook-shaped connecting members on the supporting lever and the stamping lever, a projecting lug on the supporting lever resting upon a rod-like member supported by the one arm of a pivoted lever the other arm of which is engaged by a cam on the main shaft, a second rod-like member, urged downwardly by a spring on the machine frame and resting with its hook-shaped end upon said supporting lever, a fork-shaped projection on said second rod-like member and an ejecting lever guided in said fork-shaped projection and mounted on the machine frame having a bent end terminating in the proximity of the cutters and serving as an ejector for the nails.

6. In a machine for manufacturing nails from wire, clamping jaws for holding the wire during the manufacture of the nails, point cutters for providing points at the blanks, said clamping jaws and point cutters being journalled side by side in one pair of operating levers the axis of rotation of which is at right angles to the axis of the wire, said levers forming pivots of approximately semi-circular shape at their bearing points, a two-part shaft on one side at the center of rotation of said pivots a longitudinally movable shaft on the other side at said center of rotation of the pivots, an obliquely widened wire guide channel in said longitudinally movable shaft, the surfaces of the channel situated in the front portion towards the wire feed and in the rear portion towards the middle respectively being made parallel relative to the wire feed and the distance between the two parallel surfaces corresponding to the thickness of the wire.

7. In a machine for manufacturing nails from wire, clamping jaws and point cutters journalled side by side in one pair of operating levers and held in their bearings by hook-shaped bolts having screws arranged at the side of the operating levers facing the wire feed and a stop member on one of said operating levers rotatable in a plane at right angles to the wire feed and adjustable by means of a screw the free end of which serves as an abutment for the wire in the point-cutting position.

8. In a machine for manufacturing nails from wire, means for holding the wire during the manufacture of the nails and means for cutting the points of the nails, said wire holding means and said point cutting means being journalled side by side in one pair of operating levers the axes of rotation of which being arranged in the same plane and at right angles to the axis of the wire, said levers forming pivots of approximately semi-circular shape at their bearing points, a two-part shaft on one side at the center of rotation of the said pivots, a longitudinally movable shaft on the other side at said center of rotation of the pivots and springs arranged in the two-part lever adapted to press the operating levers into their bearings, a positively reciprocated fork-shaped slide for opening and closing said operating levers, spring pressed guide members pivoted to said fork-shaped slide, rollers arranged on links carried by said operating levers, said rollers cooperating with inclined surfaces provided at said spring pressed guide members, the free end of said links working together with the fork of the said slide for the purpose of yieldingly but positively actuating said operating levers.

9. In a machine for manufacturing nails from wire, means for holding the wire during the manufacture of the nails and means for cutting the points of the nails, said wire holding means and said point cutting means being journalled side by side in one pair of operating levers the axes of rotation of which being arranged in the same plane and at right angles to the axis of the wire, said levers forming pivots of approximately semi-circular shape at their bearing points, a two-part shaft on one side at the center of rotation of the said pivots, a longitudinally movable shaft on the other side at said center of rotation of the pivots and springs arranged in the two-part lever adapted to press the operating levers into their bearings, a positively reciprocated fork-shaped slide for opening and closing said operating levers, spring pressed guide members pivoted to said fork shaped slide, rollers arranged on links carried by said operating levers, said rollers cooperating with inclined surfaces provided at said spring pressed guide members, the free end of said links working together with the fork of the said slide for the purpose of yieldingly but positively actuating said operating levers, a nail head tool mounted in a supporting lever journalled laterally and parallel at the level of the wire to be operated upon and a stamping lever actuated by a cam on the main shaft of the machine and adapted to longitudinally move the said supporting lever for the said nail head tool.

10. In a machine for manufacturing nails from wire comprising operating levers arranged in pairs, a slide for opening and closing said operating levers, clamping jaws and joint cutters journalled side by side in one pair of operating levers, a nail head tool mounted in a supporting lever journalled laterally and parallel to the wire axis, a wire feed, a cam disc actuating said wire feed, a projection on said disc for causing an initial lift by which the finished upset nail head is forced out of the clamping jaws prior to the feeding of the wire between the cutters.

In testimony whereof I affix my signature.

JAKOB WIKSCHTRÖM.